United States Patent Office 3,575,945
Patented Apr. 20, 1971

3,575,945
PROCESS FOR THE POLYMERIZATION OF VINYL COMPOUNDS
Aldo Cantoni and Moshe Kreisel, Haifa, and Moshe Bar Guri, Kfar Hassidim, Israel, assignors to Electrochemical Industries (Frutarom) Ltd., Haifa, Israel
No Drawing. Filed Apr. 17, 1968, Ser. No. 721,934
Claims priority, application Israel, Dec. 14, 1967, 29,131
Int. Cl. C08f 1/11, 1/60, 3/30
U.S. Cl. 260—92.8                                     8 Claims

ABSTRACT OF THE DISCLOSURE

A process for the suspension polymerization of vinyl derivatives, especially vinyl chloride, in which dialkyl or dialkenyl peroxydicarbonates used as polymerization initiators are produced in situ in the polymerization mixture in the presence of an alkali metal base by the interaction of hydrogen peroxide with an alkyl or alkenyl haloformate, which latter is used in a stoichiometric excess over the hydrogen peroxide of the order of 1.5 to 8 times, preferably 2 to 4 times. A conventional organic peroxide such as dilauroyl peroxide may be used in addition as a secondary polymerization initiator.

---

This invention relates to the suspension polymerization of vinyl derivatives, in particular vinyl chloride, with the aid of dialkyl or dialkenyl peroxydicarbonates as polymerization initiators.

The use of peroxydicarbonates as polymerization initiators in the manufacture of polyvinyl compounds is known. At first pre-manufactured dialkyl peroxydicarbonates have been added to the reaction mixture. This has proved to be inconvenient since these initiators are apt to cause an almost explosive reaction and to make the polymerization process uncontrollable. For this reason it has already been suggested to produce a dialkyl peroxydicarbonate initiator in situ in the polymerization mixture by the reaction of an alkyl haloformate with hydrogen peroxide (U.S. patent specification No. 3,022,281) in the presence of an alkaline substance capable of binding the hydrogen halide liberated in the course of that reaction. This known proposal stipulates the presence of a sufficient amount of hydrogen peroxide to react with the alkyl haloformate present, which means an at least stoichiometrically equivalent amount of $H_2O_2$ or possibly an excess of the latter, the stoichiometric equivalent being 1 mole of $H_2O_2$ fo reach 2 moles of alkyl haloformate. It has been found that in this way a commercially satisfactory polyvinyl product cannot be produced. In order to be commercially satisfactory the product should be granular, whereas the aforesaid known process leads to the formation of a fibrous product.

The present invention relates to the suspension polymerization of vinyl derivatives with the aid of dialkyl or dialkenyl peroxydicarbonates as polymerization initiators. It has the object to eliminate the drawbacks of the known process of this kind and to provide a process by which a commercially satisfactory granular product can be obtained in a good yield. More particularly, the invention aims at providing reaction conditions under which most of the hydrogen peroxide can be brought to reaction with the haloformate within as short a period as possible.

The invention consists in a process for the manufacture of granular commercial vinyl polymers by the suspension polymerization of vinyl monomers, wherein a dialkyl or dialkenyl peroxydicarbonate is formed in situ in the polymerization mixture by the reaction of an alkyl or alkenyl haloformate with hydrogen peroxide in the presence of an alkali metal base, the amount of the haloformate being from 1.5 to 8 times, preferably 2 to 4 times, the stoichiometric equivalent of the hydrogen peroxide present, and the amount of alkali metal base being substantially equivalent to that of the haloformate.

In this specification and the claims the term "alkali metal base" means alkali metal hydroxide either by itself or in mixture with alkali metal carbonate or bicarbonate.

In this manner the aqueous phase of the reaction mixture is alkalified to an initial pH of about 8.5 to 11.7 according to the relative proportions of the haloformate and base. The base should be present in an amount sufficient to bind the hydrogen halide liberated from the haloformate. It should, as a rule, not exceed the stoichiometric equivalent of the haloformate by more than about 10%.

The pH of the reaction mixture drops in the course of the reaction, and it has been found that the polymerization is not adversely affected even if the pH drops below 7. In the practice of this invention it is found that the higher the initial pH, up to a value of 11.7, the smaller is the necessary excess of haloformate over the hydrogen peroxide and the shorter is the period of time required for the polymerization.

It has been proposed previously to use an added secondary polymerization initator, especially a slow acting organic peroxide such as, for example, dilauroyl peroxide, in addition to the peroxydicarbonate serving as a primary initiator, for the reason that the peroxydicarbonate initiator tends to "die out" as a relatively early stage of the polymerization if, as is customary, the latter is carried out at the somewhat elevated temperature of about 52–64° C. This same measure is recommendable for the process according to the present invention as well.

The reasons why an excess of alkyl or alkenyl haloformate over the hydrogen peroxide in the reaction mixture, as stipulated by the present invention, leads to commercially satisfactory results which cannot be achieved if no such excess is used, have not yet been fully elucidated. It may possibly be assumed that a major proportion of the haloformate undergoes hydrolysis before reacting with the hydrogen peroxide so that, where the proportions had originally been stoichiometrically equivalent, an excess of hydrogen peroxide remains in the reaction mixture and initiates an undesired type of polymerization. The excess of hydrogen peroxide seems also to destroy the film of suspending agent, conventionally methyl cellulose, which envelopes the globules of vinyl compound in the course of polymerization and has the function, inter alia, of preventing these globules from coalescing during the "sticky" stage, i.e. before the polymerization has proceeded so far that colliding globules are no longer liable to coalesce even if they are no longer coated with the suspending agent. It would appear that the premature destruction of the coating of suspending agent is one of the reasons of the formation of an undesired fibrous type of polymer instead of the desired granular type.

As regards the magnitude of the excess of alkyl or alkenyl haloformate over the hydrogen peroxide, stipulated by this invention, this will be determined in accordance with the requirements of particular polymerization mixtures and polymerization conditions. In a general way it can be stated that the higher the initial pH of the reaction mixture, the lower can be the excess of haloformate. This, in turn, makes possible the use of a smaller amount of base as an acid binder whereby, in turn, a smaller amount of foreign matter (alkali metal halide) is contained in the polymer product, and as a result a higher heat stability and lower electric conductivity of the polymer is achieved.

The invention is illustrated by the following examples to which it is not limited. In the examples the proportions of particles of different size are indicated in percent, calculated on the weight of the monomer used as a starting material.

EXAMPLE 1

A glass-lined autoclave of 1.5 liter capacity, provided with thermostatic control and with a stirrer, was charged with a mixture of 640 ml. of water, 0.72 g. of methyl cellulose, 0.022 g. of a conventional silicon-organic anti-foaming agent, 0.36 g. of dilauroyl peroxide, 0.2 g. of sodium bicarbonate, 0.029 g. of sodium hydroxide (calculated as 100% NaOH) in the form of a 10% by weight aqueous solution, and 0.0125 g. of hydrogen peroxide (calculated as 100% $H_2O_2$). The mixture had an initial pH of 9.4 in the aqueous phase. The autoclave was then flushed with nitrogen to displace atmospheric air and evacuated to an absolute pressure of 0.072 atm. Thereafter 0.3 g. of ethyl chloroformate and 360 g. of vinyl chloride were charged into the reactor in such a way that the ethyl chloroformate substantially dissolved in the vinyl chloride shortly after being charged. The equivalent ratio ethyl chloroformate: $H_2O_2$ was 4:1. The stirred reaction mixture was then heated to 56° C. and the reaction was allowed to proceed at this temperature until a significant pressure drop was noticed. The reaction product had separated into a solid phase and a perfectly clear aqueous phase whose pH was 2.9. The solid was dried and constituted good, granular, commercial-grade polyvinyl chloride. Its bulk density was 0.473 g./ml., its particle size distribution:

|  | Percent |
|---|---|
| Plus 12 mesh | 3.9 |
| 12–40 mesh | 1 |
| Minus 40 mesh | 85.1 |

The yield was 90% by weight of the vinyl chloride monomer used. It was pre-mixed with dioctyl phthalate and a stabilizer and then roll-milled for 10 minutes at 155° C., to yield an essentially colourless sheet of good heat stability.

Under the conditions of this example the time ("reaction time") elapsing from the beginning of the heating until the pressure drop occurred was 7 hours 15 minutes.

EXAMPLE 2

The process was carried out as described in Example 1, except that the sodium bicarbonate was omitted and 0.12 g. of NaOH was used as the only base; the initial pH of the aqueous phase was 11.5 and the final pH was 4.0. The reaction time was 6 hours 20 minutes. The product had a bulk density of 0.610 and a size distribution of:

|  | Percent |
|---|---|
| Plus 12 mesh | 0.3 |
| 12–40 mesh | 1.7 |
| Minus 40 mesh | 90.2 |

EXAMPLE 3

The process was carried out similarly as in Example 2, but the batch contained 0.058 g. of NaOH (initial pH=11.3), 0.145 g. of ethyl chloroformate and 0.0116 g. of $H_2O_2$ (equivalent ratio about 2:1). The reaction time was 6 hours and 30 minutes, the final pH was 2.8. The polymer had a bulk density of 0.602 and a particle size distribution of:

|  | Percent |
|---|---|
| Plus 12 mesh | 0.2 |
| 12–40 mesh | 0.5 |
| Minus 40 mesh | 87.2 |

EXAMPLE 4

The batch was composed as in Example 3 but the dilauroyl peroxide was omitted. Initial pH=11.3, final pH=4.0, reaction time: 8 hours 40 minutes. The product had a bulk density of 0.548 and a particle size distribution of:

|  | Percent |
|---|---|
| Plus 12 mesh | Nil |
| 12–40 mesh | Nil |
| Minus 40 mesh | 93.0 |

If the quantities of NaOH, ethyl chloroformate and $H_2O_2$ were doubled, i.e. 0.116 g. of NaOH, 0.29 g. of ethyl chloroformate and 0.0232 g. of $H_2O_2$, the reaction time was shortened to 4 hours 55 minutes and the product achieved a higher bulk density (0.593).

EXAMPLE 5

The batch was composed similarly as in Example 2, except that the ethyl chloroformate was replaced by an equivalent amount of:

(a) iso-propyl chloroformate (0.33 g.); or
(b) β-chloroethyl chloroformate (0.38 g.); or
(c) allyl chloroformate (0.33 g.).

(ad a) Reaction time: 6 hours 50 minutes. Final pH=6.4. Product: bulk density 0.639, particle size distribution:

|  | Percent |
|---|---|
| Plus 12 mesh | 0.8 |
| 12–40 mesh | 0.9 |
| Minus 40 mesh | 87.8 |

(ad b) Reaction time: 9 hours 20 minutes, final pH=6.5. Product: bulk density 0.580, particle size distribution:

|  | Percent |
|---|---|
| Plus 12 mesh | Nil |
| 12–40 mesh | Nil |
| Minus 40 mesh | 87.7 |

(ad c) Reaction time: 9 hours 20 minutes, final pH=3.4. Product: bulk density 0.582, particle size distribution:

|  | Percent |
|---|---|
| Plus 12 mesh | Nil |
| 12–40 mesh | 0.6 |
| Minus 40 mesh | 94.7 |

EXAMPLE 6

A glass-lined autoclave of 7500 liters capacity, equipped with thermostatic control, stirrer, vacuum duct and feed duct, was charged with 4500 liters of demineralized water, 2.4 kg. of methyl cellulose (commercial brand Methocel by Dow Chemical Company, viscosity 25 centipoise in a 2% aqueous solution), 0.1 kg. of hydrogen peroxide (calculated as 100% $H_2O_2$), 1 kg. of dilauroyl peroxide, 0.57 kg. of sodium hydroxide (calculated as 100% NaOH) and 0.036 kg. of a commercial silicon-organic type of anti-foaming agent. The autoclave was then closed and evacuated, whereafter first 1.4 kg. of ethyl chloroformate and then 2500 kg. of vinyl chloride monomer were fed into the autoclave, aspirated by the vacuum obtaining in the latter. The reaction mixture, while being stirred, was heated to 49° C. and kept at this temperature for 8 hours 45 minutes when the pressure had dropped by about 3 kg./cm.². The dried product was fine, granular commercial grade polyvinyl chloride, the conversion yield was 90%. The product passed through an 80 mesh sieve and its solution in nitrobenzene had a specific viscosity of 0.44 as determined by ASTM Test No. D 1243/58T Method B. When the term "vinyl halide polymer" is used in the claims it is meant to include both homopolymers and copolymers.

What we claim is:

1. A process for the manufacture of granular commercial vinyl halide polymer by the suspension polymerization of vinyl halide monomers, wherein a dialkyl or dialkenyl peroxydicarbonate is formed in situ in the aqueous polymerization mixture by the reaction of an alkyl or alkenyl haloformate with hydrogen peroxide in the presence of an alkali metal base, the amount of the haloformate being from 1.5 to 8 times, the stoichiometric equivalent of the hydrogen peroxide present, and the amount of alkali metal base being substantially equivalent to that of the haloformate.

2. A process according to claim 1, wherein the haloformate is used in an excess of 2 to 4 times the stoichiometric equivalent of the hydrogen peroxide.

3. A process according to claim 1, wherein the haloformate used is ethyl chloroformate, $\beta$ - chloroethyl chloroformate, isopropyl chloroformate, or allyl chloromate.

4. A process according to claim 1, wherein the initial pH of the reaction mixture, measured in the aqueous phase, is chosen in the range of about 8.5 to about 11.7.

5. A process according to claim 4, wherein the pH of the reaction mixture is allowed to drop below the value of 7 in the course of the polymerization reaction.

6. A process according to claim 1, comprising adding to the reaction mixture an organic polymerization initiator as an added secondary initiator besides the dialkyl or dialkenyl peroxydicarbonate produced in situ in the reaction mixture.

7. A process according to claim 6, wherein dilauroyl peroxide is used as the secondary polymerization initiator.

8. A process according to claim 1 wherein the polymer is polyvinyl chloride.

References Cited
UNITED STATES PATENTS 3,022,281   2/1962   Smith _____ 260—92.8U JOSEPH L. SCHOFER, Primary Examiner J. A. DONAHUE, JR., Assistant Examiner